(12) United States Patent
Ladkat et al.

(10) Patent No.: US 9,234,142 B2
(45) Date of Patent: Jan. 12, 2016

(54) PROCESS AND APPARATUS FOR HYDROPROCESSING WITH TWO PRODUCT FRACTIONATORS

(71) Applicant: UOP LLC, Des Plaines, IL (US)

(72) Inventors: Kiran Ladkat, Haryana (IN); Richard K. Hoehn, Mount Prospect, IL (US); Hemant Mahajan, Haryana (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/191,183

(22) Filed: Feb. 26, 2014

(65) Prior Publication Data

US 2015/0238882 A1    Aug. 27, 2015

(51) Int. Cl.
    C10G 49/22    (2006.01)
    B01D 3/14     (2006.01)
    B01D 3/00     (2006.01)
    C10G 49/00    (2006.01)

(52) U.S. Cl.
    CPC ............ *C10G 49/22* (2013.01); *B01D 3/009* (2013.01); *B01D 3/143* (2013.01); *C10G 49/00* (2013.01)

(58) Field of Classification Search
    CPC ......... C10G 49/22; C10G 45/00; B01D 3/143
    USPC .................................. 422/608–610
    See application file for complete search history.

(56) References Cited

U.S. PATENT DOCUMENTS

| | | | |
|---|---|---|---|
| 3,313,724 A * | 4/1967 | Kniel | 208/340 |
| 4,191,640 A | 3/1980 | Chess et al. | |
| 4,936,888 A | 6/1990 | DeLong | |
| 5,342,509 A | 8/1994 | Snider et al. | |
| 2007/0185359 A1 | 8/2007 | Umansky et al. | |
| 2013/0045140 A1* | 2/2013 | Hoehn et al. | 422/187 |

FOREIGN PATENT DOCUMENTS

| | | |
|---|---|---|
| CN | 1683042 A | 10/2005 |
| CN | 202465600 U | 10/2012 |
| CN | 103059963 A | 4/2013 |

OTHER PUBLICATIONS

U.S. Appl. No. 14/191,188, filed Feb. 26, 2014.

* cited by examiner

*Primary Examiner* — Lessanework Seifu
(74) *Attorney, Agent, or Firm* — James C. Paschall

(57) ABSTRACT

A process and apparatus are disclosed for recovering hydroprocessing effluent from a hydroprocessing unit utilizing a hot stripping column and a cold stripping column. A light fractionation column fractionates naphtha from kerosene predominantly from a cold stripped stream. A heavy fractionation column fractionates diesel from unconverted oil predominantly present in a hot stripped stream. Only the hot hydroprocessing effluent is heated in a fired heater prior to entering the heavy fractionation column, resulting in substantial operating and capital savings.

20 Claims, 1 Drawing Sheet

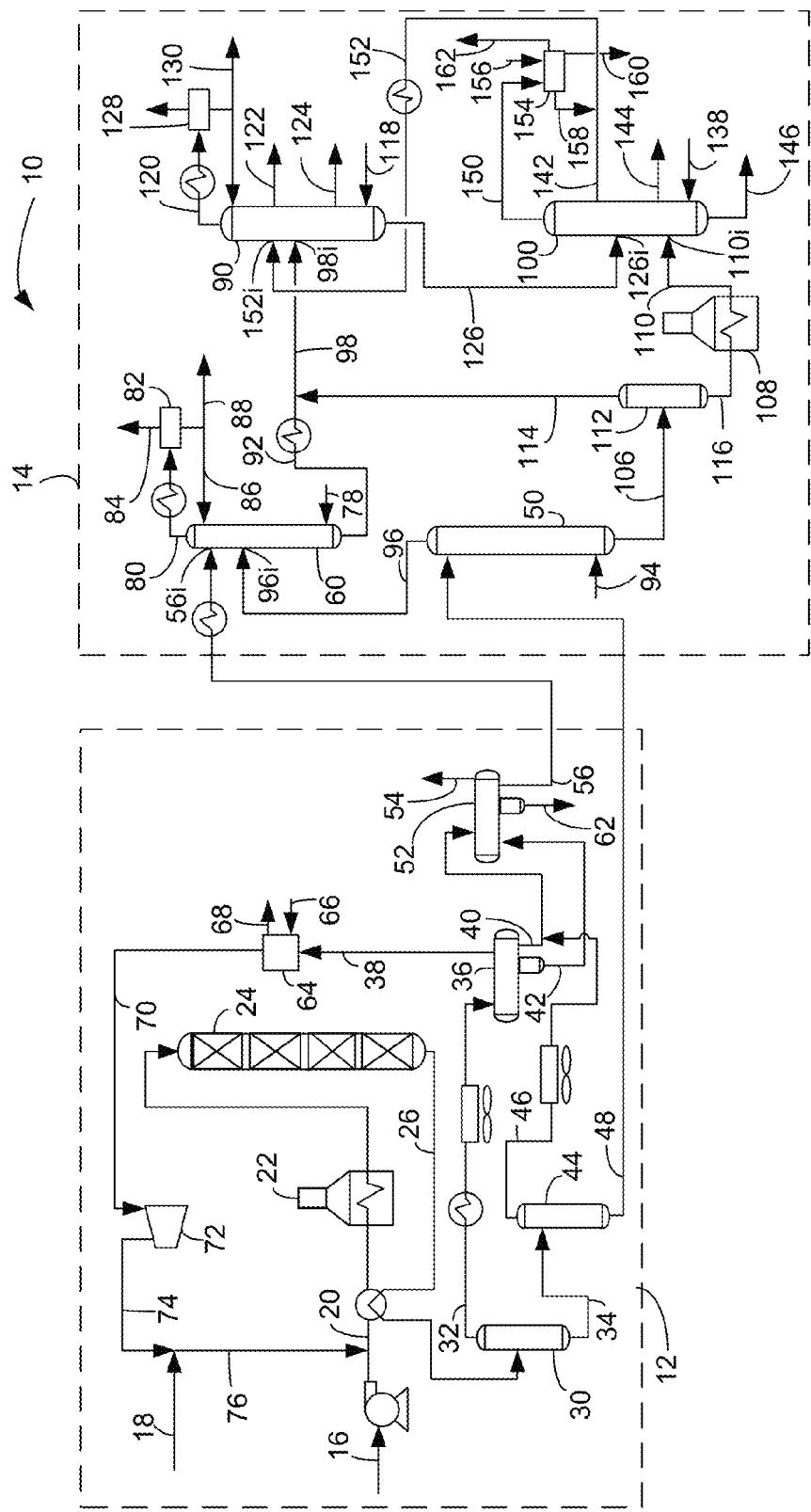

PROCESS AND APPARATUS FOR HYDROPROCESSING WITH TWO PRODUCT FRACTIONATORS

FIELD OF THE INVENTION

The field of the invention is the recovery of hydroprocessed hydrocarbon streams.

BACKGROUND OF THE INVENTION

Hydroprocessing can include processes which convert hydrocarbons in the presence of hydroprocessing catalyst and hydrogen to more valuable products.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more fixed beds of the same or different catalyst. Slurry hydrocracking is a slurried catalytic process used to crack residue feeds to gas oils and fuels.

Due to environmental concerns and newly enacted rules and regulations, saleable fuels must meet lower and lower limits on contaminates, such as sulfur and nitrogen. New regulations require essentially complete removal of sulfur from diesel. For example, the ultra low sulfur diesel (ULSD) requirement is typically less than about 10 wppm sulfur.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

Hydroprocessing recovery units typically include a stripping column for stripping hydroprocessed effluent with a stripping medium such as steam to remove unwanted hydrogen sulfide. The stripped effluent then is heated in a fired heater to fractionation temperature before entering a product fractionation column to recover products such as naphtha, kerosene and diesel.

Hydroprocessing and particularly hydrocracking is very energy-intensive due to the severe process conditions such as the high temperature and pressure used. Over time, although much effort has been spent on improving energy performance for hydrocracking, the focus has been on reducing reactor section heater duty through efficient heat exchange network design. However, a large heater duty is required to heat stripped effluent before entering the product fractionation column to separate diesel from unconverted oil.

Newly enacted rules and regulations impose boiling point ranges on commercial diesel. Euro IV and V diesel specifications require diesel product to have a T95 at 360° C. meaning that 95 vol % of the diesel stream must boil off when it is heated to 360° C. To meet this specification, a conventional product fractionator requires a large heat input, a large number of trays and more operating expense to effect the separation.

There is a continuing need, therefore, for improved methods of recovering fuel products from hydroprocessed effluents. Such methods must be more energy efficient and less capital intensive to meet the increasing needs of refiners.

BRIEF SUMMARY OF THE INVENTION

One embodiment of the invention is a hydroprocessing process comprising hydroprocessing a hydrocarbon feed in a hydroprocessing reactor to provide a hydroprocessing effluent stream; stripping a hot hydroprocessing effluent stream in a hot stripping column to provide a hot stripped stream; stripping a cold hydroprocessing effluent stream in a cold stripping column to provide a cold stripped stream; fractionating the cold stripped stream in a light fractionation column; and fractionating the hot stripped stream in a heavy fractionation column.

Another embodiment of the invention is a hydroprocessing apparatus comprising a hydroprocessing reactor; a cold stripping column in communication with the hydroprocessing reactor for stripping a cold hydroprocessing effluent stream; a hot stripping column in communication with the hydroprocessing reactor for stripping a hot hydroprocessing effluent stream; a light fractionation column in communication with the cold stripping column; and a heavy fractionation column in communication with the hot stripping column.

BRIEF DESCRIPTION OF THE DRAWING

The FIGURE is a simplified process flow diagram of an embodiment of the present invention.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 volume percent or 95 volume percent, as the case may be, respectively, of the sample boils using ASTM D-86.

As used herein, the term "diesel cut point" is between about 343° C. (650° F.) and about 399° C. (750° F.) using the TBP distillation method.

As used herein, the term "diesel boiling range" means hydrocarbons boiling in the range of between about 132° C. (270° F.) and the diesel cut point using the TBP distillation method.

As used herein, the term "diesel conversion" means conversion of feed to material that boils at or below the diesel cut point of the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

DETAILED DESCRIPTION

A two product fractionation process and apparatus is proposed. The first fractionation column fractionates lighter hydroprocessed effluent from a bottom of a cold stripping column and operates slightly above atmospheric pressure to separate the kerosene and naphtha portions of the feed and leave diesel and unconverted oil as a bottoms product. The second fractionation column operates at a vacuum and fractionates heavier hydroprocessed effluent fed from the bottom of a hot stripping column and perhaps bottoms liquid from the first fractionation column. This second fractionation column separates diesel from an unconverted oil stream. Because some light material may be present in the feed to the second fractionation column from the hot stripping column, it may be necessary to recycle material lighter than diesel to the first fractionation column.

The apparatus and process 10 for hydroprocessing hydrocarbons comprise a hydroprocessing unit 12 and a product recovery unit 14. A hydrocarbon stream in hydrocarbon line 16 and a make-up hydrogen stream in hydrogen make-up line 18 are fed to the hydroprocessing unit 12. Hydroprocessing effluent is fractionated in the product recovery unit 14.

A hydrogen stream in hydrogen line 76 supplemented by make-up hydrogen from line 18 may join the hydrocarbon feed stream in feed line 16 to provide a hydroprocessing feed stream in feed line 20. The hydroprocessing feed stream in line 20 may be heated by heat exchange and in a fired heater 22 and fed to the hydroprocessing reactor 24.

In one aspect, the process and apparatus described herein are particularly useful for hydroprocessing a hydrocarbonaceous feedstock. Illustrative hydrocarbon feedstocks include hydrocarbonaceous streams having components boiling above about 288° C. (550° F.), such as atmospheric gas oils, vacuum gas oil (VGO) boiling between about 315° C. (600° F.) and about 600° C. (1100° F.), deasphalted oil, coker distillates, straight run distillates, pyrolysis-derived oils, high boiling synthetic oils, cycle oils, hydrocracked feeds, catalytic cracker distillates, atmospheric residue boiling at or above about 343° C. (650° F.) and vacuum residue boiling above about 510° C. (950° F.).

Hydroprocessing that occurs in the hydroprocessing unit 12 may be hydrocracking or hydrotreating. Hydrocracking refers to a process in which hydrocarbons crack in the presence of hydrogen to lower molecular weight hydrocarbons. Hydrocracking is the preferred process in the hydroprocessing unit 12. Consequently, the term "hydroprocessing" will include the term "hydrocracking" herein. Hydrocracking also includes slurry hydrocracking in which residue feed is mixed with catalyst and hydrogen to make a slurry and cracked to lower boiling products.

Hydroprocessing that occurs in the hydroprocessing unit may also be hydrotreating. Hydrotreating is a process wherein hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point of the hydrotreated product may also be reduced. A hydrocracking reactor may be preceded by a hydrotreating reactor and a separator (not shown) to remove sulfur and nitrogen contaminants from the feed to the hydrocracking reactor.

The hydroprocessing reactor 24 may be a fixed bed reactor that comprises one or more vessels, single or multiple beds of catalyst in each vessel, and various combinations of hydrotreating catalyst and/or hydrocracking catalyst in one or more vessels. It is contemplated that the hydroprocessing reactor 24 be operated in a continuous liquid phase in which the volume of the liquid hydrocarbon feed is greater than the volume of the hydrogen gas. The hydroprocessing reactor 24 may also be operated in a conventional continuous gas phase, a moving bed or a fluidized bed hydroprocessing reactor.

If the hydroprocessing reactor 24 is operated as a hydrocracking reactor, it may provide total conversion of at least about 20 vol-% and typically greater than about 60 vol-% of the hydrocarbon feed to products boiling below the diesel cut point. A hydrocracking reactor may operate at partial conversion of more than about 50 vol-% or full conversion of at least about 90 vol-% of the feed based on total conversion. A hydrocracking reactor may be operated at mild hydrocracking conditions which will provide about 20 to about 60 vol-%, preferably about 20 to about 50 vol-%, total conversion of the hydrocarbon feed to product boiling below the diesel cut point. If the hydroprocessing reactor 24 is operated as a hydrotreating reactor, it may provide conversion per pass of about 10 to about 30 vol-%.

If the hydroprocessing reactor 24 is a hydrocracking reactor, the first vessel or bed in the hydrocracking reactor 24 may include hydrotreating catalyst for the purpose of saturating, demetallizing, desulfurizing or denitrogenating the hydrocarbon feed before it is hydrocracked with hydrocracking catalyst in subsequent vessels or beds in the hydrocracking reactor 24. If the hydrocracking reactor is a mild hydrocracking reactor, it may contain several beds of hydrotreating catalyst followed by a fewer beds of hydrocracking catalyst. If the hydroprocessing reactor 24 is a slurry hydrocracking reactor, it may operate in a continuous liquid phase in an upflow mode and will appear different than in the FIGURE which depicts a fixed bed reactor. If the hydroprocessing reactor 24 is a hydrotreating reactor it may comprise more than one vessel and multiple beds of hydrotreating catalyst. The hydrotreating reactor may also contain hydrotreating catalyst that is suited for saturating aromatics, hydrodewaxing and hydroisomerization.

A hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the first hydrocracking reactor 24 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 percent, and preferably at least about 20 percent, metal-cation-deficient, based on the initial ion-exchange capacity. In another aspect, a desirable and stable class of zeolites is one wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt % noble metal.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 371° C. (700° F.) to about 648° C. (1200° F.) in order to activate the catalyst and decompose ammonium ions.

Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 20.7 MPa (gauge) (3000 psig), a liquid hourly space velocity (LHSV) from about 0.4 to less than about 2.5 $hr^{-1}$ and a hydrogen rate of about 421 (2,500 scf/bbl) to about 2,527 $Nm^3/m^3$ oil (15,000 scf/bbl). If mild hydrocracking is desired, conditions may include a temperature from about 315° C. (600° F.) to about 441° C. (825° F.), a pressure from about 5.5 MPa (gauge) (800 psig) to about 13.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 2 $hr^{-1}$ and preferably about 0.7 to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present description that more than one type of hydrotreating catalyst be used in the same hydrotreating reactor 24. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig), preferably 4.1 MPa (gauge) (600 psig) to about 20.6 MPa (gauge) (3000 psig), suitably 12.4 MPa (gauge) (1800 psig), preferably 6.9 MPa (gauge) (1000 psig), a liquid hourly space velocity of the fresh hydrocarbonaceous feedstock from about 0.1 $hr^{-1}$, suitably 0.5 $hr^{-1}$, to about 4 $hr^{-1}$, preferably from about 1.5 to about 3.5 $hr^{-1}$, and a hydrogen rate of about 168 $Nm^3/m^3$ (1,000 scf/bbl), to about 1,011 $Nm^3/m^3$ oil (6,000 scf/bbl), preferably about 168 $Nm^3/m^3$ oil (1,000 scf/bbl) to about 674 $Nm^3/m^3$ oil (4,000 scf/bbl), with a hydrotreating catalyst or a combination of hydrotreating catalysts.

A hydroprocessing effluent exits the hydroprocessing reactor 24 and is transported in hydroprocessing effluent line 26. The hydroprocessing effluent comprises material that will become a cold hydroprocessing effluent stream and a hot hydroprocessing effluent stream. The hydroprocessing unit may comprise one or more separators for separating the hydroprocessing effluent stream into a cold hydroprocessing effluent stream and hot hydroprocessing effluent stream.

The hydroprocessing effluent in hydroprocessing effluent line 26 may in an aspect be heat exchanged with the hydroprocessing feed stream in line 20 to be cooled before entering a hot separator 30. The hot separator separates the hydroprocessing effluent to provide a vaporous hydrocarbonaceous hot separator overhead stream in an overhead line 32 comprising a portion of a cold hydroprocessed effluent stream and a liquid hydrocarbonaceous hot separator bottoms stream in a bottoms line 34 comprising a portion of a cold hydroprocessed effluent stream and/or at least a portion of a hot hydroprocessed effluent stream. The hot separator 30 in the hydroprocessing section 12 is in downstream communication with the hydroprocessing reactor 24. The hot separator 30 operates at about 177° C. (350° F.) to about 371° C. (700° F.) and preferably operates at about 232° C. (450° F.) to about 315° C. (600° F.). The hot separator 30 may be operated at a slightly lower pressure than the hydroprocessing reactor 24 accounting for pressure drop of intervening equipment. The hot separator may be operated at pressures between about 3.4 MPa (gauge) (493 psig) and about 20.4 MPa (gauge) (2959 psig). The liquid hydrocarbonaceous hot separator bottoms stream 34 may have a temperature of the operating temperature of the hot separator 30.

The vaporous hydrocarbonaceous hot separator overhead stream in the overhead line 32 may be cooled before entering a cold separator 36. As a consequence of the reactions taking place in the hydroprocessing reactor 24 wherein nitrogen, chlorine and sulfur are removed from the feed, ammonia and hydrogen sulfide are formed. At a characteristic temperature, ammonia and hydrogen sulfide will combine to form ammonium bisulfide and ammonia and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the line 32 transporting the hot separator overhead stream, a suitable amount of wash water (not shown) may be introduced into line 32 upstream at a point in line 32 where the temperature is above the characteristic sublimation temperature of either compound.

The cold separator 36 serves to separate hydrogen from hydrocarbon in the hydroprocessing effluent for recycle to the hydroprocessing reactor 24 in the overhead line 38. The vaporous hydrocarbonaceous hot separator overhead stream may be separated in the cold separator 36 to provide a vaporous cold separator overhead stream comprising a hydrogen-rich gas stream in an overhead line 38 and a liquid cold separator bottoms stream in the bottoms line 40 comprising at least a portion of the cold hydroprocessing effluent stream. The cold separator 36, therefore, is in downstream communication with the overhead line 32 of the hot separator 30 and the hydroprocessing reactor 24. The cold separator 36 may be operated at about 100° F. (38° C.) to about 150° F. (66° C.), suitably about 115° F. (46° C.) to about 145° F. (63° C.), and just below the pressure of the hydroprocessing reactor 24 and the hot separator 30 accounting for pressure drop of intervening equipment to keep hydrogen and light gases in the overhead and normally liquid hydrocarbons in the bottoms. The cold separator may be operated at pressures between about 3 MPa (gauge) (435 psig) and about 20 MPa (gauge) (2,901 psig). The cold separator 36 may also have a boot for collecting an aqueous phase in line 42. The liquid cold separator bottoms stream may have a temperature of the operating temperature of the cold separator 36.

The liquid hydrocarbonaceous stream in the hot separator bottoms line 34 may be fractionated as hot hydroprocessing effluent stream in the product recovery unit 14. In an aspect, the liquid hydrocarbonaceous stream in the bottoms line 34 may be let down in pressure and flashed in a hot flash drum 44 to provide a hot flash overhead stream of light ends in an overhead line 46 comprising a portion of the cold hydroprocessed effluent stream and a heavy liquid stream in a hot flash bottoms line 48 comprising at least a portion of the hot hydroprocessed effluent stream. The hot flash drum 44 may be any separator that splits the liquid hydroprocessing effluent into vapor and liquid fractions. The hot flash drum 44 may be operated at the same temperature as the hot separator 30 but at a lower pressure of between about 1.4 MPa (gauge) (200 psig) and about 6.9 MPa (gauge) (1000 psig), suitably less than about 3.4 MPa (gauge) (500 psig). The heavy liquid stream in bottoms line 48 may be further fractionated in the product recovery unit 14. In an aspect, the heavy liquid stream in bottoms line 48 may be introduced into a hot stripping column 50 and comprise at least a portion, and suitably all, of a relatively hot hydroprocessing effluent stream. The hot stripping column 50 is in downstream communication with a bottom of the hot flash drum 44 via the hot flash bottoms line 48. The hot flash bottoms stream in the hot flash bottoms line 48 may have a temperature of the operating temperature of the hot flash drum 44.

In an aspect, the liquid hydroprocessing effluent stream in the cold separator bottoms line 40 may be fractionated as a cold hydroprocessing effluent stream in the product recovery unit 14. In a further aspect, the cold separator liquid bottoms stream may be let down in pressure and flashed in a cold flash drum 52 to separate the cold separator liquid bottoms stream in bottoms line 40. The cold flash drum 52 may be any separator that splits hydroprocessing effluent into vapor and liquid fractions. The cold flash drum may be in downstream communication with a bottoms line 40 of the cold separator 36. A cold stripping column 60 may be in downstream communication with a bottoms line 56 of the cold flash drum 52.

In a further aspect, the vaporous hot flash overhead stream in overhead line 46 may be fractionated as a cold hydroprocessing effluent stream in the product recovery unit 14. In a further aspect, the hot flash overhead stream may be cooled and also separated in the cold flash drum 52. The cold flash drum 52 may separate the cold separator liquid bottoms stream in line 40 and hot flash vaporous overhead stream in overhead line 46 to provide a cold flash overhead stream in overhead line 54 and a cold flash bottoms stream in a bottoms line 56 comprising at least a portion of a cold hydroprocessed effluent stream. The cold flash bottoms stream in bottoms line 56 comprises at least a portion, and suitably all, of the cold hydroprocessed effluent stream. In an aspect, the cold stripping column 60 is in downstream communication with the cold flash drum 52 and the cold flash bottoms line 56. The cold flash drum 52 may be in downstream communication with the bottoms line 40 of the cold separator 36, the overhead line 46 of the hot flash drum 44 and the hydroprocessing reactor 24. The cold separator bottoms stream in bottoms line 40 and the hot flash overhead stream in overhead line 46 may enter into the cold flash drum 52 either together or separately. In an aspect, the hot flash overhead line 46 joins the cold separator bottoms line 40 and feeds the hot flash overhead stream and the cold separator bottoms stream together to the cold flash drum 52. The cold flash drum 52 may be operated at the same temperature as the cold separator 36 but typically at a lower pressure of between about 1.4 MPa (gauge) (200 psig) and about 7.0 MPa (gauge) (1000 psig) and preferably no higher than 3.1 MPa (gauge) (450 psig). The aqueous stream in line 42 from the boot of the cold separator may also be directed to the cold flash drum 52. A flashed aqueous stream is removed from a boot in the cold flash drum 52 in line 62. The cold flash bottoms stream in bottoms line 56 may have the same operating temperature as the cold flash drum 52.

The vaporous cold separator overhead stream comprising hydrogen in the overhead line 38 is rich in hydrogen. The cold separator overhead stream in overhead line 38 may be passed through a trayed or packed scrubbing tower 64 where it is scrubbed by means of a scrubbing liquid such as an aqueous amine solution in line 66 to remove hydrogen sulfide and ammonia. The spent scrubbing liquid in line 68 may be regenerated and recycled back to the scrubbing tower 64. The scrubbed hydrogen-rich stream emerges from the scrubber via line 70 and may be compressed in a recycle compressor 72 to provide a recycle hydrogen stream in line 74 which is a compressed vaporous hydroprocessing effluent stream. The recycle compressor 72 may be in downstream communication with the hydroprocessing reactor 24. The recycle hydrogen stream in line 74 may be supplemented with make-up hydrogen stream 18 to provide the hydrogen stream in hydrogen line 76. A portion of the material in line 74 may be routed to the intermediate catalyst bed outlets in the hydroprocessing reactor 24 to control the inlet temperature of the subsequent catalyst bed (not shown).

The product recovery section 14 may include a hot stripping column 50, a cold stripping column 60, a light fractionation column 90 and a heavy fractionation column 100. The cold stripping column 60 is in downstream communication with the hydroprocessing reactor 24 for stripping the cold hydroprocessing effluent stream which is a portion of the hydroprocessing effluent stream in hydroprocessing effluent line 26, and the hot stripping column 50 is in downstream communication with the hydroprocessing reactor 24 for stripping the hot hydroprocessing effluent stream which is also a portion of the hydroprocessing effluent stream in hydroprocessing effluent line 26. In an aspect, the cold hydroprocessing effluent stream is the cold flash bottoms stream in bottoms line 56 and the hot hydroprocessing effluent stream is the hot flash bottoms stream in bottoms line 48, but other sources of these streams are contemplated. For example, if the hot flash drum 44 and the cold flash drum were omitted, the cold separator bottoms stream in line 40 would be the cold hydroprocessing effluent stream and the hot separator bottoms stream in line 48 would be the hot hydroprocessing effluent stream. The hot hydroprocessing effluent stream is hotter than the cold hydroprocessing effluent stream, by at least 25° C. and preferably at least 50° C.

The cold hydroprocessing effluent stream which in an aspect may be in the cold flash bottoms line 56 may be heated and fed to the cold stripping column 60 near the top of the column at inlet 56*i*. The cold hydroprocessing effluent stream which comprises at least a portion of the liquid hydroprocessing effluent may be stripped in the cold stripping column 60 with a cold stripping media which is an inert gas such as steam from a cold stripping media line 78 to provide a cold vapor stream of naphtha, hydrogen, hydrogen sulfide, steam and other gases in an overhead line 80. At least a portion of the cold vapor stream may be condensed and separated in a receiver 82. An overhead line 84 from the receiver 82 carries vaporous off gas for further treating. Unstabilized liquid naphtha from the bottoms of the receiver 82 may be split between a reflux portion in line 86 refluxed to the top of the cold stripping column 60 and a product portion which may be transported in product line 88 to further fractionation such as in a debutanizer or a deethanizer column (not shown). A sour water stream may be collected from a boot (not shown) of the overhead receiver 82.

The cold stripping column 60 may be operated with a bottoms temperature between about 149° C. (300° F.) and about 288° C. (550° F.), preferably about 260° C. (500° F.), and an overhead pressure of about 0.17 MPa (gauge) (25 psig), preferably about 0.5 MPa (gauge) (73 psig), to about 2.0 MPa (gauge) (290 psig). The temperature in the overhead receiver 82 ranges from about 38° C. (100° F.) to about 66° C. (150° F.) and the pressure is essentially the same as in the overhead of the cold stripping column 60.

We have found that a hydrocracked cold stripped stream in bottoms line 92 comprises predominantly naphtha and kerosene boiling materials. Consequently, the cold stripped stream in cold stripped bottoms line 92 may be heated with a process heater that is less intensive than a fired heater and fed to a light fractionation column 90. In the light fractionation column 90, the cold stripped stream is fractionated to separate naphtha from kerosene. The cold stripped stream 92 enters the light fractionation column at a cold fractionation inlet 98*i*. Consequently, the light fractionation column 90 is in downstream communication with the cold stripped bottoms line 92 of the cold stripping column 60 and the cold stripping column 60. The cold stripped stream may be mixed with a hot overhead stream in line 114 before entering the light fractionation column 90 in mixed line 98.

The hot hydroprocessing effluent stream which may be in the hot flash bottoms line 48 may be fed to the hot stripping column 50 near the top thereof. The hot hydroprocessing effluent stream which comprises at least a portion of the liquid hydroprocessing effluent may be stripped in the hot stripping column 50 with a hot stripping media which is an inert gas such as steam from line 94 to provide a hot vapor stream of naphtha, hydrogen, hydrogen sulfide, steam and other gases in an overhead line 96. The overhead line 96 may be condensed and a portion refluxed to the hot stripping column 50. However, in the embodiment of the FIGURE, the hot vapor stream in the overhead line 96 from the overhead of the hot stripping column 50 is fed into the cold stripping column 60 directly at an inlet 96*i* in an aspect without first being condensed or refluxing. The inlet 56*i* for the cold hydroprocessing effluent stream may be at a higher elevation than the inlet 96*i* for the hot vapor stream of overhead line 96. The hot stripping column 50 may be operated with a bottoms temperature between about 160° C. (320° F.) and about 360° C. (680° F.) and an overhead pressure of about 0.17 MPa (gauge) (25 psig), preferably about 0.5 MPa (gauge) (73 psig), to about 2.0 MPa (gauge) (292 psig).

A hydroprocessed hot stripped stream is produced in a hot stripped bottoms line 106. At least a portion of the hot stripped bottoms stream in the hot stripped bottoms line 106 may be fed to the heavy fractionation column 100. Consequently, the heavy fractionation column 100 is in downstream communication with the hot stripped bottoms line 106 of the hot stripping column 50 and the hot stripping column 50.

A fired heater 108 in downstream communication with the hot stripped bottoms line 106 may heat at least a portion of the hot stripped stream before it enters the product fractionation column 100 in a line 110. The cold stripped stream in line 92 may be fed to the light fractionation column 90 at a temperature that does not require heating in a fired heater. No fired heater is on the cold stripped bottoms line 92 from the cold stripping column 60. The cold stripped bottoms line 92 and mixed line 98 carrying the cold stripped stream to the light fractionation column 90 may bypass all fired heaters.

In an aspect, the hot stripped bottoms stream in hot bottoms line 106 may be separated in a separator 112 in downstream communication with the hot stripping column 50 upstream of the fired heater 108. A vaporous hot overhead stream in a hot overhead line 114 from the separator 112 may be passed into the light fractionation column 90 in downstream communication with a hot overhead line 114 from the separator 112 with or separate from the cold stripped stream in the cold stripped line 92. A liquid hot stripped stream in a hot stripped bottoms line 116 may be the portion of the hot stripped stream that is fed to the heavy fractionation column 100 in downstream communication with a hot bottoms line from the separator 112. The hot stripped stream may be fed to the heavy fractionation column 100 after being heated in the fired heater 108 to be a fired hot stripped stream in the fired hot stripped line 110. The fired hot stripped stream in line 110 may be introduced into the heavy fractionation column 100 at an inlet 110*i*.

By fractionating the bulk of the naphtha from the kerosene in the light fractionation column 90, the heavy fractionation column 100 may separate diesel from unconverted oil at a lower temperature and at less vacuum or higher pressure. Consequently, the hot stripped stream in the fired hot stripped line 110 may be fed to the heavy fractionation column 100 at a temperature below about 385° C. (725° F.), preferably about 371° C. (700° F.). The hot stripped stream in line 110 is at a hotter temperature than the cold stripped stream in line 92 and the light fractionation stream in the mixed line 98.

The light fractionation column 90 may be in downstream communication with the cold stripping column 60 and the hot stripping column 50 for separating stripped streams into product streams. The light fractionation column 90 may strip the cold stripped stream in line 92 and also a portion of the hot stripped stream in line 106, which may be the vaporous hot overhead stream in line 114, with stripping media such as steam from line 118 to provide several product streams. In an aspect, the cold stripped stream from line 92 and the vaporous hot overhead stream in line 114 may be combined in mixed line 98 and enter the light fractionation column 90 at inlet 98*i*. The product streams from the light fractionation column 90 may include an overhead light naphtha stream in overhead line 120, a heavy naphtha stream in line 122 from a side cut outlet, and a kerosene stream carried in line 124 from a side cut outlet. A heavy stream comprising diesel and unconverted oil may be provided in a bottoms line 126. Heat may be removed from the light fractionation column 90 by cooling the heavy naphtha in line 122 and kerosene in line 124 and sending a portion of each cooled stream back to the light fractionation column. These product streams may also be stripped to remove light materials to meet product purity requirements. The overhead naphtha stream in line 120 may be condensed and separated in a receiver 128 with a portion of the liquid being refluxed back to the light fractionation column 90. The net light naphtha stream in line 130 may be combined with the unstabilized naphtha in line 88 and be further processed before blending in a gasoline pool. It is also contemplated that the unstabilized naphtha in line 88 and the light naphtha in line 130 may be processed separately. The light fractionation column 90 may be operated with a bottoms temperature between about 177° C. (350° F.), preferably about 232° C. (450° F.), and about 315° C. (600° F.), preferably about 370° C. (700° F.), and at an overhead pressure between about 7 kPa (gauge) (1 psig) and about 69 kPa (gauge) (10 psig). A portion of a heavy stream in the bottoms line 126 may be reboiled and returned to the product fractionation column 90 instead of adding an inert stream such as steam to heat to the light fractionation column 60. The heavy stream in the bottoms line 126 from the light fractionation column comprises predominantly diesel and unconverted oil. The unconverted oil will boil above the diesel cut point.

A water stream may be collected from a boot (not shown) of the overhead receiver 128 and be re-used used as wash water in the hot separator overhead line 32 for washing of ammonium bisulfide and ammonium chloride salts.

We have found that a hydroprocessed hot stripped stream in bottoms line 106 and in the hot stripped line 116 comprises predominantly diesel and unconverted oil materials. Consequently, the hot stripped stream in the hot stripped line 116 may be heated in a fired heater and fed to a heavy fractionation column 100. In the heavy fractionation column 100, the hot stripped stream is fractionated to separate diesel from unconverted oil. The fired hot stripped stream enters the heavy fractionation column 100 in a fired hot stripped line 110 at a hot stripped inlet 110*i*. The heavy stream in light fractionation bottoms line 126 comprises predominantly diesel and unconverted oil and may then be fed to the heavy fractionation column at an inlet 126*i* at an elevation above an elevation of the hot stripped inlet 110*i* for the hot stripped stream in line 110. The heavy fractionation column 100 is therefore in downstream communication with the cold stripping column 60, but the light fractionation column 90 is in downstream communication with the cold stripping column 60 upstream of the heavy fractionation column 100. Consequently, the light fractionation column 90 is in upstream communication with the heavy fractionation column 100.

The heavy fractionation column 100 may be in downstream communication with the hot stripping column 50 for fractionating the hot stripped stream in line 106, 116 and/or 110 into product streams. The heavy fractionation column 100 may also be in downstream communication with the cold stripping column 60 for fractionating the light fractionation bottoms stream in line 126 which may comprise a portion of the cold stripped stream in line 92. Accordingly, the light fractionation bottoms stream in the light fractionation bottoms line 126 of said light fractionation column 90 may be fed into the heavy fractionation column 100. Consequently, the heavy fractionation column 100 is in downstream communication with the bottom line 126 from the light fractionation column 90. An inert gas such as steam from line 138 may provide heat to the heavy fractionation column and strip lighter components from the heavier components. The heavy fractionation column 100 produces a diesel product stream in line 144 from a side cut outlet. The heavy fractionation column operates to produce a diesel stream with a diesel TBP cut point of between about 370° and about 390° C. and a T95 of no more than 380° C. and preferably no more than 360° C.

A heavy upper stream may be provided in an upper line from an upper half of the heavy fractionation column from an overhead outlet in overhead line 150 and/or a side line 142 from a side cut outlet and fed in a heavy return line 152 to the light fractionation column 90 at an inlet 152*i*. The inlet 152*i* for the heavy upper stream in line 152 in downstream communication with the upper line 142, 150 may be at a higher elevation than the inlet 98*i* for the cold stripped stream in line 92 or the feed inlet for the hot overhead stream from the hot overhead line 114 to the light fractionation column 90. The light fractionation column 90 is in downstream communication with an upper line 142, 150 from an upper half of the heavy fractionation column 100. Accordingly, the light fractionation column 90 is also in downstream communication with the hot stripping column 50, but the heavy fractionation column 100 or the separator 112 is in downstream communication with the hot stripping column 50 upstream of the light fractionation column 90.

An unconverted oil stream in a heavy bottoms line 146 may be recovered from a bottom of the heavy fractionation column 100. The unconverted oil stream has a boiling point above the diesel cut point and may be recycled to the hydroprocessing reactor 24 or to a second hydroprocessing reactor (not shown). Additionally, a heavy polynuclear aromatic stream concentrated in heavy polynuclear aromatics may be recovered from the unconverted oil stream in the heavy bottoms line 146 before the unconverted oil stream is delivered in the heavy bottoms line 146 for further hydroprocessing.

The heavy fractionation column 100 is operated at below atmospheric pressure in the overhead. The overhead stream in overhead line 150 may feed a vacuum generating device 154. The vacuum generating device 154 may include and eductor in communication with an inert gas stream 156 such as steam which pulls a vacuum on the overhead stream in the overhead line 150. A condensed hydrocarbon stream in line 158 from the vacuum generating device 154 may supply the heavy return stream 152 by itself or with the upper stream in the side line 142. A condensed aqueous stream may also be removed from the vacuum generating device in line 160. A hydrocarbonaceous vaporous stream may be removed from the vapor generating device in line 162.

Heat may be removed from the heavy fractionation column 100 by cooling the light stream in line 142 and/or the diesel stream in line 144 and sending a portion of each cooled stream back to the column. The diesel stream in line 144 may be stripped to remove light materials to meet product purity requirements. The heavy fractionation column 100 may be operated with a bottoms temperature between about 260° C. (500° F.), and about 370° C. (700° F.), preferably about 300° C. (570° F.), and at an overhead pressure between about 10 kPa (absolute) (1.5 psia), preferably about 20 kPa (absolute) (3 psia), and about 70 kPa (gauge) (10 psig). A portion of the unconverted oil in the heavy bottoms line 146 may be reboiled and returned to the heavy fractionation column 100 instead of using steam stripping to add heat to the heavy fractionation column 100.

Example

The present embodiments which utilize two product fractionation columns 90, 100 instead of a single product fractionation column counter-intuitively saves capital expense and operating expense. The fired heater 108 heats only the bottoms liquid from the hot stripping column 50 and perhaps only a liquid portion of the hot stripped bottoms liquid, so it requires less duty and capacity. The light fractionation column 90 is heated by streams available in the fractionation section 14. Because the heavy fractionation column 100 operates at a vacuum, the fired heater outlet temperature of the hot stripped stream 110 is lower than would be required for an atmospheric fractionation column to adequately separate diesel from unconverted oil. Consequently, the fired heater duty is surprisingly more than 50% less than a design with a single product fractionation column. In addition, it has been determined that electricity usage is reduced by over 15% and low pressure steam consumption is reduced by over 60%, although medium pressure steam consumption increases by 23% and cooling water is 3.2 times the design with a single product fractionation column. The capital cost for the present invention with two product fractionation columns 90, 100 is surprisingly over 15% less than a design with a single product fractionation column.

Specific Embodiments

While the following is described in conjunction with specific embodiments, it will be understood that this description is intended to illustrate and not limit the scope of the preceding description and the appended claims.

A first embodiment of the invention is a hydroprocessing process comprising hydroprocessing a hydrocarbon feed in a hydroprocessing reactor to provide a hydroprocessing effluent stream; stripping a hot hydroprocessing effluent stream in a hot stripping column to provide a hot stripped stream; stripping a cold hydroprocessing effluent stream in a cold stripping column to provide a cold stripped stream; fractionating the cold stripped stream in a light fractionation column; and fractionating the hot stripped stream in a heavy fractionation column. An embodiment of the invention is one, any or all of prior embodiments in this paragraph up through the first embodiment in this paragraph further comprising separating the hydroprocessing effluent stream into the cold hydroprocessing effluent stream and the hot hydroprocessing effluent stream. An embodiment of the invention is one, any or all of prior embodiments in this paragraph up through the first embodiment in this paragraph further comprising separating the hydroprocessing effluent stream in a hot separator to provide a hot separator overhead stream comprising at least a portion of the cold hydroprocessing effluent stream and a hot separator bottoms stream comprising at least a portion of the hot hydroprocessing effluent stream. An embodiment of the invention is one, any or all of prior embodiments in this paragraph up through the first embodiment in this paragraph further comprising separating the hot separator overhead stream in a cold separator to provide a cold separator overhead stream and a cold separator bottoms stream comprising at least a portion of the cold hydroprocessing effluent stream and separating the hot separator bottoms stream in a hot flash drum to provide a hot flash overhead stream comprising at least a portion of the cold hydroprocessed effluent stream and a hot flash bottoms stream comprising the hot hydroprocessing effluent stream. An embodiment of the invention is one, any or all of prior embodiments in this paragraph up through the first embodiment in this paragraph further comprising separating the cold separator bottoms stream in a cold flash drum to provide a cold flash overhead stream and a cold flash bottoms stream, the cold flash bottoms stream comprising the cold hydroprocessed effluent stream. An embodiment of the invention is one, any or all of prior embodiments in this paragraph up through the first embodiment in this paragraph further comprising separating the hot flash overhead stream in the cold flash drum to provide a cold flash overhead stream and a cold flash bottoms stream, the cold flash bottoms stream comprising the cold hydroprocessed effluent stream. An embodiment of the invention is one, any or all of prior embodiments in this paragraph up through the first embodiment in this paragraph further comprising feeding a bottoms stream of the light fractionation column into the heavy fractionation column. An embodiment of the invention is one, any or all of prior embodiments in this paragraph up through the first embodiment in this paragraph further comprising feeding an overhead stream of the hot stripping column into the cold stripping column. An embodiment of the invention is one, any or all of prior embodiments in this paragraph up through the first embodiment in this paragraph further comprising separating a hot stripped bottoms stream from the hot stripping column to provide a hot overhead stream and the hot stripped stream and feeding the hot overhead stream to the light fractionation column. An embodiment of the invention is one, any or all of prior embodiments in this paragraph up through the first embodiment in this paragraph further comprising feeding an upper stream of the heavy fractionation column to the light fractionation column. An embodiment of the invention is one, any or all of prior embodiments in this paragraph up through the first embodiment in this paragraph further comprising feeding an upper stream of the heavy fractionation column to the light fractionation column at an inlet above a feed inlet for the hot overhead stream. An embodiment of the invention is one, any or all of prior embodiments in this paragraph up through the first embodiment in this paragraph further comprising recovering a naphtha stream and a kerosene stream from the light fractionation column. An embodiment of the invention is one, any or all of prior embodiments in this paragraph up through the first embodiment in this paragraph further comprising recovering a diesel stream and an unconverted oil stream from the heavy fractionation column, operating with a diesel TBP cut point of between about 370° and about 390° C. and the diesel stream having a T95 of no more than 360° C. An embodiment of the invention is one, any or all of prior embodiments in this paragraph up through the first embodiment in this paragraph wherein the heavy fractionation column operates at below atmospheric pressure. An embodiment of the invention is one, any or all of prior embodiments in this paragraph up through the first embodiment in this paragraph wherein the hot stripped stream is fed to the heavy fractionation column at a temperature below 371° C.

A second embodiment of the invention is a hydroprocessing process comprising hydroprocessing a hydrocarbon feed in a hydroprocessing reactor to provide a hydroprocessing effluent stream; stripping a hot hydroprocessing effluent stream in a hot stripping column to provide a hot stripped stream; stripping a cold hydroprocessing effluent stream in a cold stripping column to provide a cold stripped stream; fractionating the cold stripped stream in a light fractionation column; fractionating the hot stripped stream in a heavy fractionation column; and feeding an overhead stream of the heavy fractionation column to the light fractionation column. An embodiment of the invention is one, any or all of prior embodiments in this paragraph up through the second embodiment in this paragraph further comprising separating a hot stripped bottoms stream from the hot stripping column to provide a hot overhead stream and the hot stripped stream and feeding the hot overhead stream to the light fractionation column. An embodiment of the invention is one, any or all of prior embodiments in this paragraph up through the second embodiment in this paragraph further comprising feeding an overhead stream of the heavy fractionation column to the light fractionation column at an inlet above a feed inlet for the hot overhead stream.

A third embodiment of the invention is a hydroprocessing process comprising hydroprocessing a hydrocarbon feed in a hydroprocessing reactor to provide a hydroprocessing effluent stream; stripping a hot hydroprocessing effluent stream in a hot stripping column to provide a hot stripped stream; stripping a cold hydroprocessing effluent stream in a cold stripping column to provide a cold stripped stream; fractionating the cold stripped stream in a light fractionation column to provide a naphtha stream and a kerosene stream; and fractionating the hot stripped stream in a heavy fractionation column to provide a diesel stream and an unconverted oil stream. An embodiment of the invention is one, any or all of prior embodiments in this paragraph up through the third embodiment in this paragraph further comprising recovering a diesel stream and an unconverted oil stream from the heavy fractionation column, operating with a diesel TBP cut point of between about 370° and about 390° C. and the diesel stream having a T95 of no more than 360° C.

A fourth embodiment of the invention is a hydroprocessing apparatus comprising a hydroprocessing reactor; a cold stripping column in communication with the hydroprocessing reactor for stripping a cold hydroprocessing effluent stream; a hot stripping column in communication with the hydroprocessing reactor for stripping a hot hydroprocessing effluent stream; a light fractionation column in communication with the cold stripping column; and a heavy fractionation column in communication with the hot stripping column. An embodiment of the invention is one, any or all of prior embodiments in this paragraph up through the fourth embodiment in this paragraph wherein the heavy fractionation column is also in communication with the cold stripping column, but the light fractionation column is in communication with the cold stripping column upstream of the heavy fractionation column. An embodiment of the invention is one, any or all of prior embodiments in this paragraph up through the fourth embodiment in this paragraph wherein the light fractionation column is in communication with an upper line from the heavy fractionation column. An embodiment of the invention is one, any or all of prior embodiments in this paragraph up through the fourth embodiment in this paragraph wherein an inlet to the light fractionation column in downstream communication with the upper line from the heavy fractionation column may be at a higher elevation than an inlet to the light fractionation column of a cold stripped line from the cold stripping column. An embodiment of the invention is one, any or all of prior embodiments in this paragraph up through the fourth embodiment in this paragraph wherein the light fractionation column is also in communication with the hot stripping column, but the heavy fractionation column is in communication with the hot stripping column upstream of the light fractionation column. An embodiment of the invention is one, any or all of prior embodiments in this paragraph up through the fourth embodiment in this paragraph wherein the heavy fractionation column is in communication with a bottom line from the light fractionation column. An embodiment of the invention is one, any or all of prior embodiments in this paragraph up through the fourth embodiment in this paragraph further comprising a separator in communication with the hot stripping column; the light fractionation column in communication with a hot overhead line from the separator and the heavy fractionation column in communication with a hot bottom line from the separator. An embodiment of the invention is one, any or all of prior embodiments in this paragraph up through the fourth embodiment in this paragraph further comprising a fired heater on the hot bottom line but not on a cold stripped line from the cold stripping column. An embodiment of the invention is one, any or all of prior embodiments in this paragraph up through the fourth embodiment in this paragraph further comprising one or more separators in communication with the hydroprocessing reactor for separating a hydroprocessing effluent stream from the hydroprocessing reactor into the cold hydroprocessing effluent stream and hot hydroprocessing effluent stream. An embodiment of the invention is one, any or all of prior embodiments in this paragraph up through the fourth embodiment in this paragraph further comprising a hot separator in communication with the hydroprocessing reactor and the hot stripping column is in communication with the hot separator. An embodiment of the invention is one, any or all of prior embodiments in this paragraph up through the fourth embodiment in this paragraph further comprising a cold separator in communication with an overhead line of the hot separator the cold stripping column is in communication with the cold separator. An embodiment of the invention is one, any or all of prior embodiments in this paragraph up through the fourth embodiment in this paragraph further comprising a cold flash drum in communication with a bottom line of the cold separator, the cold stripping column being in communication with a bottom of the cold flash drum. An embodiment of the invention is one, any or all of prior embodiments in this paragraph up through the fourth embodiment in this paragraph further comprising a hot flash drum in communication with a bottom line of the hot separator, the hot stripping column being in communication with a bottom line of the hot flash drum. An embodiment of the invention is one, any or all of prior embodiments in this paragraph up through the fourth embodiment in this paragraph further comprising a cold flash drum in communication with an overhead line of the hot flash drum, the cold stripping column being in communication with a bottom of the cold flash drum.

A fifth embodiment of the invention is a hydroprocessing apparatus comprising a hydroprocessing reactor; a cold stripping column in communication with the hydroprocessing reactor for stripping a cold hydroprocessing effluent stream; a hot stripping column in communication with the hydroprocessing reactor for stripping a hot hydroprocessing effluent stream; a light fractionation column in communication with the cold stripping column; a heavy fractionation column in communication with the hot stripping column; and the light fractionation column in communication with an upper line from the heavy fractionation column. An embodiment of the invention is one, any or all of prior embodiments in this paragraph up through the fifth embodiment in this paragraph wherein an inlet to the light fractionation column in downstream communication with the upper line from the heavy fractionation column may be at a higher elevation than an inlet to the light fractionation column of a cold stripped line from the cold stripping column. An embodiment of the invention is one, any or all of prior embodiments in this paragraph up through the fifth embodiment in this paragraph wherein the heavy fractionation column is in communication with a bottom line from the light fractionation column.

A sixth embodiment of the invention is a hydroprocessing apparatus comprising a hydroprocessing reactor; a cold stripping column in communication with the hydroprocessing reactor for stripping a cold hydroprocessing effluent stream; a hot stripping column in communication with the hydroprocessing reactor for stripping a hot hydroprocessing effluent stream; a light fractionation column in communication with the cold stripping column; a heavy fractionation column in communication with the hot stripping column; and a separator in communication with the hot stripping column; the light fractionation column in communication with a hot overhead line from the separator and the heavy fractionation column in communication with a hot bottom line from the separator. An embodiment of the invention is one, any or all of prior embodiments in this paragraph up through the sixth embodiment in this paragraph wherein the light fractionation column is in communication with an upper line from the heavy fractionation column. An embodiment of the invention is one, any or all of prior embodiments in this paragraph up through the sixth embodiment in this paragraph further comprising a fired heater on the hot bottom line but not on a cold stripped line from the cold stripping column.

Without further elaboration, it is believed that by using the preceding description, one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A hydroprocessing apparatus comprising:
a hydroprocessing reactor;
a cold stripping column in communication with the hydroprocessing reactor for stripping a cold hydroprocessing effluent stream;
a hot stripping column in communication with the hydroprocessing reactor for stripping a hot hydroprocessing effluent stream;
a light fractionation column in communication with said cold stripping column;
a heavy fractionation column in communication with said hot stripping column; and
a diesel product stream line in communication with a side cut outlet of said heavy fractionation column;
wherein said light fractionation column and said heavy fractionation column are two distinct fractionation columns.

2. The hydroprocessing apparatus of claim 1 wherein said heavy fractionation column is also in communication with said cold stripping column, but said light fractionation column is in communication with said cold stripping column upstream of said heavy fractionation column.

3. The hydroprocessing apparatus of claim 2 wherein said light fractionation column is in communication with an upper line from an upper half of said heavy fractionation column.

4. The hydroprocessing apparatus of claim 3 wherein an inlet to said light fractionation column in downstream communication with said upper line from an upper half of said heavy fractionation column is at a higher elevation than an inlet to said light fractionation column of a cold stripped line from said cold stripping column.

5. The hydroprocessing apparatus of claim 1 wherein said light fractionation column is also in communication with said hot stripping column, but said heavy fractionation column is in communication with said hot stripping column upstream of said light fractionation column.

6. The hydroprocessing apparatus of claim 4 wherein said heavy fractionation column is in communication with a bottom line from said light fractionation column.

7. The hydroprocessing apparatus of claim 1 further comprising a separator in communication with said hot stripping column; said light fractionation column in communication with a hot overhead line from said separator and said heavy fractionation column in communication with a hot bottom line from said separator.

8. The hydroprocessing apparatus of claim 1 further comprising a fired heater on said hot bottom line but not on a cold stripped line from said cold stripping column.

9. The hydroprocessing apparatus of claim 1 further comprising one or more separators in communication with said hydroprocessing reactor for separating a hydroprocessing effluent stream from said hydroprocessing reactor into said cold hydroprocessing effluent stream and hot hydroprocessing effluent stream.

10. The hydroprocessing apparatus of claim 9 further comprising a hot separator in communication with said hydroprocessing reactor and said hot stripping column is in communication with said hot separator.

11. The hydroprocessing apparatus of claim 10 further comprising a cold separator in communication with an overhead line of said hot separator, said cold stripping column being in communication with said cold separator.

12. The hydroprocessing apparatus of claim 11 further comprising a cold flash drum in communication with a bottom line of said cold separator, said cold stripping column being in communication with a bottom of said cold flash drum.

13. The hydroprocessing apparatus of claim 10 further comprising a hot flash drum in communication with a bottom line of said hot separator, said hot stripping column being in communication with a bottom line of said hot flash drum.

14. The hydroprocessing apparatus of claim 13 further comprising a cold flash drum in communication with an overhead line of said hot flash drum, said cold stripping column being in communication with a bottom of said cold flash drum.

15. A hydroprocessing apparatus comprising:
a hydroprocessing reactor;
a cold stripping column in communication with the hydroprocessing reactor for stripping a cold hydroprocessing effluent stream;
a hot stripping column in communication with the hydroprocessing reactor for stripping a hot hydroprocessing effluent stream;
a light fractionation column in communication with said cold stripping column;
a heavy fractionation column in communication with said hot stripping column through a hot stripped line feeding said heavy fractionation column, and said heavy fractionation column in communication with a bottom line from said light fractionation column; and
said light fractionation column being in communication with an upper line from an upper half of said heavy fractionation column;
wherein said light fractionation column and said heavy fractionation column are two distinct fractionation columns.

16. The hydroprocessing apparatus of claim 15 wherein an inlet to said light fractionation column in downstream communication with an upper line from an upper half of said heavy fractionation column is at a higher elevation than an inlet to said light fractionation column of a cold stripped line from said cold stripping column.

17. The hydroprocessing apparatus of claim 15 wherein said heavy fractionation column is in communication with a bottom line from said light fractionation column.

18. A hydroprocessing apparatus comprising:
a hydroprocessing reactor;
a cold stripping column in communication with the hydroprocessing reactor for stripping a cold hydroprocessing effluent stream;
a hot stripping column in communication with the hydroprocessing reactor for stripping a hot hydroprocessing effluent stream;
a light fractionation column in communication with said cold stripping column;
a heavy fractionation column in communication with said hot stripping column, said light fractionation column and said heavy fractionation column being two distinct fractionation columns; and
a separator in communication with said hot stripping column;
said light fractionation column being in communication with a hot overhead line from said separator and said heavy fractionation column being in communication with a hot bottom line from said separator.

19. The hydroprocessing apparatus of claim 18 wherein said light fractionation column is in communication with an upper line from an upper half of said heavy fractionation column.

20. The hydroprocessing apparatus of claim 18 further comprising a fired heater on said hot bottom line but not on a cold stripped line from said cold stripping column.

* * * * *